A. N. COLE.
Improvement in Apparatus for Separating Oil from Cotton-Waste, &c.

No. 128,594.

2 Sheets--Sheet 1.

Patented July 2, 1872.

Henry Grist.
John Grist, Junr.

Witnesses.

Andrew Norton Cole
Inventor.

A. N. COLE.
Improvement in Apparatus for Separating Oil from Cotton-Waste, &c.

No. 128,594.

Patented July 2, 1872.

Henry Grist
John Grist, Junr.

Witnesses.

Andrew Norton Cole

Inventor 128,594

UNITED STATES PATENT OFFICE.

ANDREW NORTON COLE, OF BROCKVILLE, CANADA.

IMPROVEMENT IN APPARATUS FOR SEPARATING OIL FROM COTTON-WASTE, &c.

Specification forming part of Letters Patent No. 128,594, dated July 2, 1872.

Specification describing certain Improvements in Oil Separating, Purifying, and Waste-Renovating Apparatus, invented by ANDREW NORTON COLE, of the town of Brockville, in the county of Leeds, in the Province of Ontario and Dominion of Canada.

The first part of my invention relates to the combination of a series of tanks, compression-rollers, and beaters, for the manipulation of oil-saturated cotton and other waste with chemical solutions for separating the oil and cleansing the waste. The second part of my invention relates to the combination of a wire-cloth reel and radiating arms and shaft, which reel revolves horizontally in an opposite direction to its shaft, provided with radiating arms, and the arrangement of shaft-pulleys for operating the same to disintegrate, dry, and cleanse from dust the waste-cotton fiber. The third part of my invention relates to the construction of a filtering-vessel, in which the oil by centrifugal motion is forced through a series of revolving filtering bodies to purify the extracted oil and make it again fit for use.

Figure 1:
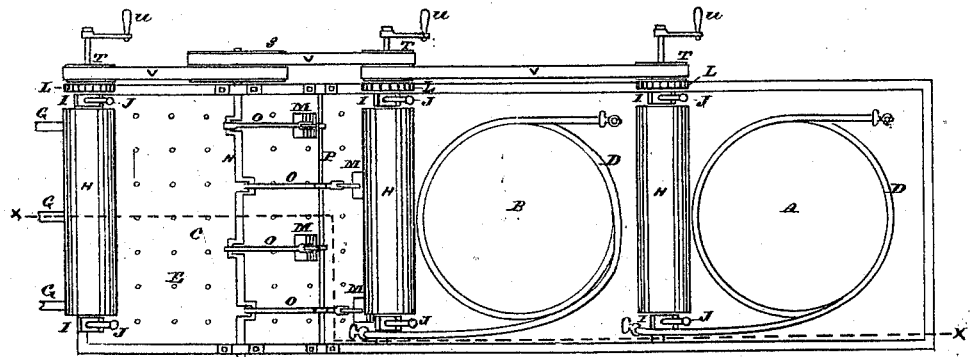
Figure 2:
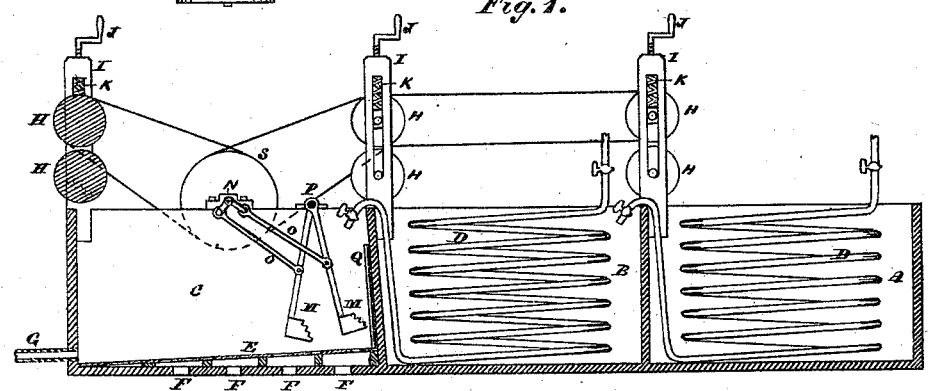
Figure 3:
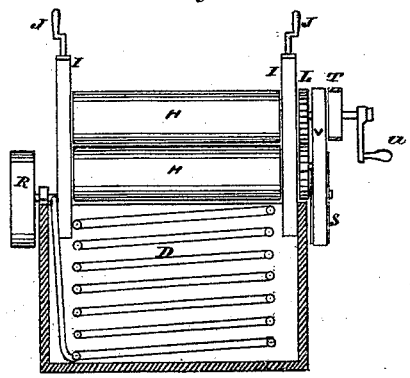
Figure 5:
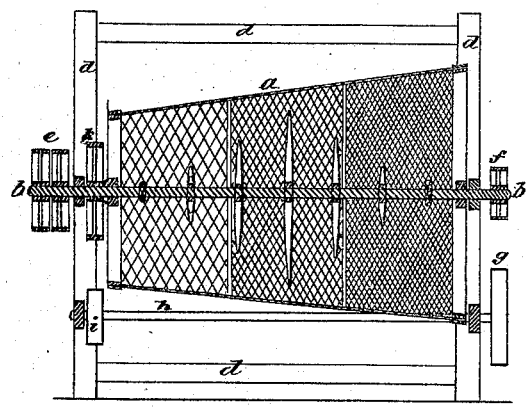
Figure 4:
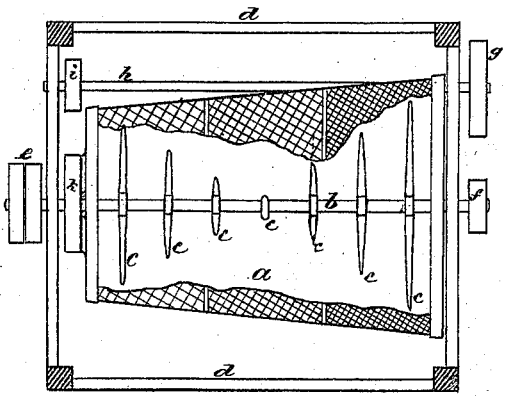
Figure 6:
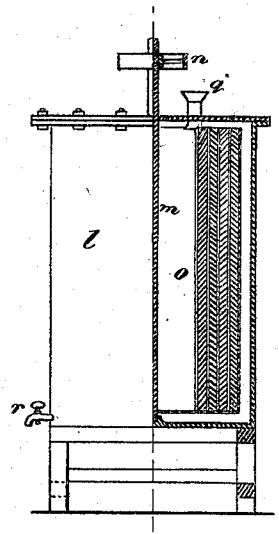
Figure 7:
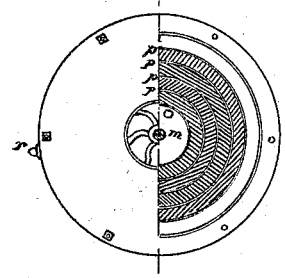

Figure 1 is a top view of the apparatus embodying the first part of my invention. Fig. 2 is a longitudinal vertical section of the same on the line $xx$. Fig. 3 is a transverse vertical section of the same through the tank A. Fig. 4 is a top view of the apparatus embodying the second part of my invention. Fig. 5 is a longitudinal vertical section of the same through the central shaft. Fig. 6 is an elevation of the oil-filter embodying the third part of my invention, one-half being shown in section. Fig. 7 is a top view of the same, one-half being shown in section.

My invention has reference to an apparatus for effecting the process for extracting or separating oil from cotton-waste or refuse cotton and restoring its absorbent quality, for which Letters Patent were granted dated June 6, 1871, and numbered 115,708.

A B C are a series of tanks, heated by hot water or steam pipes D, arranged in coils or other suitable manner, or by fire-heat applied under the tanks. The tank A is to contain the first chemical solution described in the above-mentioned Letters Patent, and the oil-saturated cotton. The tank B contains the second-described solution, and the waste-cotton after treatment in the tank A. The tank C contains hot water, in which the cotton is rinsed after treatment in the tank B. The tank C is supplied with hot water from the pipes D, heated in any convenient manner. It is provided with a perforated false bottom, E, through which the dirty water passes and escapes through apertures F in the bottom of the tank. Water is also admitted to the tank through the pipes G. Each tank is provided with a pair of compression-rollers, H, operating in frames I, secured to the edge of each tank, through which rollers the cotton, &c., is passed when transferred from one tank to another to squeeze out the superfluous liquid. These frames are provided with screws J to operate spiral springs K to regulate compression of the rollers, which are revolved by gear-wheels L and by pulleys T, driven by endless bands V. M are a series of beaters of any required number, suspended on a shaft, N, provided with a corresponding number of cranks, and are operated by rods O connecting therewith. A rod, P, passes through the arms of the beaters, and forms a pivot center for each. These beaters manipulate the cotton against a corrugated false side, Q, and by their action the cotton-waste is cleansed by rinsing. To one end of the shaft N is keyed the driving-pulley R, and to the other end is keyed a pulley, S, to drive the endless belts of the pulleys T for rotating the compression-rollers. If required, the rollers may be operated by hand-power applied to the cranks U, and thus dispense with belts and pulleys. The renovated or cleansed cotton, after passing through the compression-rollers from the tank C, is disintegrated in a tapering reel, $a$, of wire cloth, which is revolved upon a longitudinal shaft, $b$, which is provided with a series of radiating arms, $c$, arranged spirally thereon to work the cotton from the small to the large end of the reel. The longitudinal shaft $b$ has its bearings in the frame $d$, and is revolved by a pulley, $e$, at one end, driven by an endless belt. To the other end of the shaft $b$ is keyed a pulley, $f$, carrying a belt over a pulley, $g$, on a lower shaft, $h$, passing through the frame $d$. To the other end of the shaft $h$ is keyed a pulley, $i$, which carries a belt over a pulley, $k$, secured to a beam crossing the diameter of the reel. By means of this arrangement of pulleys and shaft the reel is rotated in a direction contrary to the shaft $b$ and at less speed. The shaft $b$ being driven at a higher rate of speed, and having a motion contrary to the reel, causes the revolving arms to disintegrate the fiber of the cotton-waste and facilitate its drying. The small particles of dust, &c., passes through the open wire cloth, and thus the cotton-waste, &c., is renovated and again made fit for use.

The chemical solution used in the tank B separates the oil from the waste, and is removed by skimming or other means. This oil is then to be purified in a filter, shown in Figs. 6 and 7, in which $l$ is the outer fixed cylinder of the filter, in which revolves, by means of a central shaft, $m$, and pulley $n$, a filtering-cylinder, $o$, constructed with a series of perforated plates, $p$, forming annular chambers, to receive different filtering bodies, the first or inner one being packed with coarse sand or gravel, the second one with coarse charcoal, the third with filtering-cloth, and the fourth with fine charcoal. The oil is inserted into the filtering-cylinder $o$ through a tube, $q$, and by centrifugal motion is forced through the different filtering substances and passes to the bottom of the cylinder $l$ in a purified state, from whence it is drawn off by a cock, $r$, fit to be again used for lubricating purposes.

I am aware that an apparatus has heretofore been used for washing and cleaning cotton and woolen waste, composed of a series of tanks or vessels, so as to alternately immerse and wring the material, and I therefore lay no claim to such an apparatus; but What I do claim as new, and desire to secure by Letters Patent, is—

1. The combination of the tanks A B C, pipes D, compression-rollers H, and beating arms M, arranged and operating substantially in the manner and for the purpose set forth.

2. The arrangement of the crank-shaft N, rod P, beaters M, and pulleys S T T T, all operating together, as and for the purpose set forth.

3. The combination of the reel $a$, shaft $b$, arms $c$, and arrangement of pulley-shaft $h$, pulleys $f$, $g$, $i$, and $k$, all operating in the manner and for the purpose set forth.

4. The vertical rotary filtering-cylinder $o$ provided with a series of perforated plates, $p$ $p$, all extending to the bottom of said cylinder, and operated within the cylinder $l$, provided with a cock, $r$, in the manner herein set forth.

ANDREW NORTON COLE.

Witnesses:
HENRY GRIST,
JOHN GRIST, Jr.